United States Patent [19]
Daly et al.

[11] Patent Number: 5,553,292
[45] Date of Patent: Sep. 3, 1996

[54] METHOD AND SYSTEM FOR MINIMIZING THE EFFECTS OF DISRUPTIVE HARDWARE ACTIONS IN A DATA PROCESSING SYSTEM

[75] Inventors: James C. Daly, Millbrook; Jonel George, Pleasant Valley; Paul G. Greenstein, Fishkill; John T. Rodell, Wappingers Falls, all of N.Y.

[73] Assignee: International Business Machines Corporation, Armonk, N.Y.

[21] Appl. No.: 361,179

[22] Filed: Dec. 21, 1994

Related U.S. Application Data

[63] Continuation of Ser. No. 30,761, Mar. 12, 1993, abandoned.

[51] Int. Cl.$^6$ ............................ G06F 9/46; G06F 11/00
[52] U.S. Cl. ............................ 395/733; 395/182.22
[58] Field of Search ............................ 395/733–737, 395/182.22, 183.22, 650, 800, 775

[56] References Cited

U.S. PATENT DOCUMENTS

| | | | |
|---|---|---|---|
| 4,381,540 | 4/1983 | Lewis et al. | 364/200 |
| 4,589,090 | 5/1986 | Downing et al. | 395/182.08 |
| 4,648,031 | 3/1987 | Jenner | 395/575 |
| 4,654,821 | 3/1987 | Lapp | 395/750 |
| 4,674,038 | 6/1987 | Brelsford et al. | 395/575 |
| 4,689,739 | 8/1987 | Federico et al. | 395/737 |
| 4,719,565 | 1/1988 | Moller | 395/733 |
| 4,757,442 | 7/1988 | Sakata | 364/200 |
| 4,815,076 | 3/1989 | Denney et al. | 371/11.1 |
| 4,907,228 | 3/1990 | Bruckert et al. | 371/68.3 |
| 4,916,704 | 4/1990 | Bruckert et al. | 371/68.3 |
| 5,005,174 | 4/1991 | Bruckert et al. | 371/68.3 |
| 5,056,091 | 10/1991 | Hunt | 371/14 |
| 5,099,485 | 3/1992 | Bruckert et al. | 371/68.3 |
| 5,117,352 | 5/1992 | Falek | 395/575 |
| 5,223,950 | 6/1993 | Hosaka et al. | 358/437 |
| 5,241,668 | 8/1993 | Eastridge et al. | 395/575 |
| 5,274,797 | 12/1993 | Barlow et al. | 395/575 |
| 5,315,161 | 5/1994 | Robinson et al. | 307/66 |
| 5,438,677 | 8/1995 | Adams et al. | 395/736 |
| 5,446,910 | 8/1995 | Kennedy et al. | 395/800 |

FOREIGN PATENT DOCUMENTS

| | | |
|---|---|---|
| 56-057160 | 5/1981 | Japan. |
| 61-029966 | 2/1986 | Japan. |
| 1042742 | 2/1989 | Japan. |
| 4004455 | 1/1992 | Japan. |
| 4075150 | 3/1992 | Japan. |

OTHER PUBLICATIONS

"Enterprise Systems Architecture/390 Principles of Operation", IBM Publication No. SA22-7201-00.
"Enterprise System 3090/Enterprise System 9000 Processor Resource Systems Manager Planning Guide", IBM Publication No. GA22-7123-07.

*Primary Examiner*—Gopal C. Ray
*Attorney, Agent, or Firm*—Lawrence D. Cutter, Esq.; Heslin & Rothenberg, P.C.

[57] ABSTRACT

When the hardware needs to perform a disruptive hardware action, such as a stop of one or more central processors, the hardware provides advance notification to all affected operating systems. The advance notification includes the time that the proposed disruptive action is intended to be initiated and its projected duration. In one instance, the hardware does not proceed with the disruptive action until it receives return acknowledgment from the operating systems that the disruptive action can be performed. The operating systems may respond back to the hardware to proceed as planned with the disruptive action or to reinitiate it only after a specified delay. This allows the operating systems time to prepare for any consequences of the disruptive action.

29 Claims, 5 Drawing Sheets fig. 1 fig. 2 fig. 3 fig. 4 fig. 5 fig. 6 fig. 7 fig. 8

METHOD AND SYSTEM FOR MINIMIZING THE EFFECTS OF DISRUPTIVE HARDWARE ACTIONS IN A DATA PROCESSING SYSTEM

This application is a continuation of application Ser. No. 08/030,761, filed Mar. 12, 1993, now abandoned.

TECHNICAL FIELD

This invention relates in general to data processing systems and, in particular, to a method and system for controlling disruptive hardware actions within a single, multiple or coupled system.

BACKGROUND ART

The sophistication of today's data processing systems permits events, such as dynamic microcode installation and the reassignment of storage to occur. However, such events require the stopping of any central processors affected by the events often resulting in outages or termination of software programs that are timed with the time of day clock or external time reference. In addition, in a coupled system environment, central processor stops can prevent the system from maintaining a heartbeat or freeing a critical global resource which could, in turn, result in another system taking a disruptive recovery action against the system experiencing the stop.

The advent of larger and larger machines and the implementation of new, more complex hardware functions in these machines has increased both the number and the duration of disruptive hardware actions, specifically central processor stops. In addition, software systems, such as operating systems, subsystems and applications executing on the machines have become more sensitive to the disruptions.

A stop of a central processor may cause a disruptive recovery action, such as termination of a unit of work, alternate central processing unit recovery (ACR), partitioning of a sysplex member which requires a subsequent re-IPL, etc. The interdependency between the software systems and a cross-system coupling facility environment makes this problem worse. Cross-system coupling facility requires constant communications between the separate operating system images running either on separate central processing complexes (CPCs) or in separate logical partitions in the logically partitioned mode on one central processing complex. A hardware event on one such central processor complex or hardware action in response to a request from one of the operating system images can adversely affect many or all of the other operating systems. There is presently no way for operating systems in such an environment to be notified that a disruptive hardware action is to occur, and there is no way for the affected operating systems to delay the hardware event until they are ready.

Presently, the hardware and software indicate changed states or capabilities only after the function causing the change has been completed, but not prior to initiating the change. Often such change will produce an unanticipated disruption to the processing on the system. If the operating system received advance notification that a disruptive event was to occur, the operating system could take action to minimize effects of that disruption.

There is no precedent of advance notification of a pending hardware initiated stop of the central processor. In one instance, when International Business Machines' Multiple Virtual Storage (MVS) System performs a storage reconfiguration, MVS knows that a stop will follow and, therefore, sets a bit for MVS recovery (excessive spin loop detection) and the problem is ignored. However, this is not an advance notification mechanism. In addition, operating systems that are running on other machines or in other logical partitions of the same machine are still unaware of the stop. For them, the central processor stop is still unexpected and disruptive.

Therefore, a need exists for an advance notification system in which all of the affected operating systems are notified prior to the performance of a hardware disruptive action, such as a central processor stop. Further, a need exists for the ability of the operating systems to indicate whether they are ready for such a stop or whether they need additional time before the stop may occur.

DISCLOSURE OF INVENTION

The shortcomings of the prior art are overcome and additional advantages are provided through the provision of a method for controlling disruptive hardware actions in a data processing system. The data processing system includes an operating system and advance notification is provided to the operating system that a disruptive action is to occur. Subsequent to providing advance notification, the disruptive action is performed.

In one embodiment, the operating system acknowledges the occurrence of the disruptive action prior to such action being performed. In particular, the operating system determines whether the disruptive action is to take place.

In a further embodiment, advance notification is provided by a predefined command. In one instance, the predefined command includes a signal stop event buffer having a timeout count indicating when the disruptive action is to occur and a stop count indicating the projected duration of the disruptive action.

In yet a further embodiment, the data processing system includes a plurality of operating systems and advance notification is provided to one or more of the operating systems affected by the disruptive action.

In a further aspect of the invention, a system for controlling disruptive hardware actions in a data processing system including an operating system is provided. Means are included for providing advance notification to the operating system that a disruptive action is to occur and for performing the disruptive action after advance notification is provided.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

BEST MODE FOR CARRYING OUT THE INVENTION

In accordance with the principles of the present invention, a technique for controlling disruptive hardware actions is provided. In particular, a mechanism is provided wherein advance notification is provided by hardware (e.g, a service call logical processor) to one or more operating systems indicating that a disruptive action, such as a stop of the central processor, is to take place. The mechanism of the present invention applies to various data processing systems, including but not limited to, single systems, multiple systems running under CPC in logically partitioned (LPAR) mode or any other hypervisor, such as IBM's Virtual Machine (VM) operating system, and coupled systems, as described in detail below.

Figure 1:
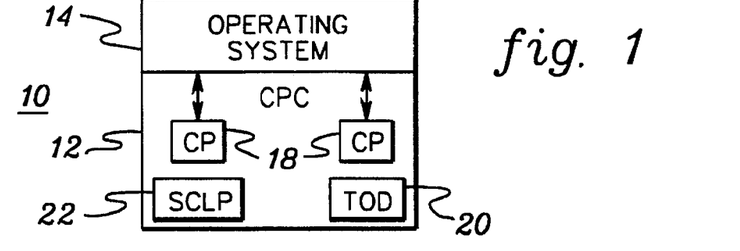
FIG. 1 depicts one example of a data processing system having a single operating system, which incorporates the principles of the present invention.

One example of a single system incorporating the technique of the present invention is depicted in FIG. 1. Referring to FIG. 1, a data processing system 10 includes one central processing complex (CPC) 12 and one operating system 14. Each of these components is described in detail below.

Central processing complex 12 may be an International Business Machines' (IBM) system following the Enterprise Systems Architecture/390 Principles of Operation as described in IBM publication SA22-7201-00, which is hereby incorporated by reference. In one example, central processing complex 12 includes one or more central processors 18 for controlling execution of programs and the processing of data, a time of day (TOD) clock 20 for maintaining time and a service call logical processor (SCLP) 22 for controlling interactions between operating system 14 and central processing complex 12. As is known, service call logical processor (SCLP) 22 may be comprised of several hardware components and may be located within central processing complex 12, be an external unit coupled thereto or be partly located within the CPC and partly external to the CPC. In addition to the above, central processing complex 12 includes storage, input/output (I/O) hardware and system controls (not shown).

Coupled to central processing complex 12 and executed by central processors 18, is operating system 14, which may be, for instance, International Business Machines' Multiple Virtual Storage (MVS) system or as another example, International Business Machines' Virtual Machine (VM) system.

Figure 2:
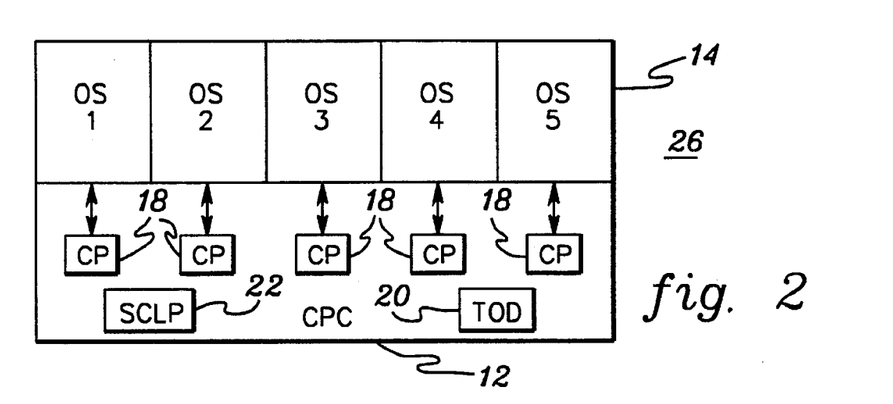
FIG. 2 depicts one embodiment of a data processing system having multiple operating systems in separate logical partitions on the same CPC, which incorporates the technique of the present invention.

As mentioned previously, the advance notification technique of the present invention applies to multiple systems in LPAR mode or under another hypervisor, as well as single systems. With reference to FIG. 2, one embodiment of a multiple data processing system 26 incorporating the mechanism of the present invention is described in detail. Like reference numbers are used for similar components.

As shown in FIG. 2, data processing system 26 is logically partitioned (under the known logical partitioning (LPAR) mode), such that one central processing complex 12 is coupled to a number of operating systems 14 (e.g., OS 1–OS 5). In particular, located within central processing complex 12 are a plurality of central processors 18, each of which executes one or more of operating systems 14. As described above with data processing system 10, data processing system 26 also includes time of day clock 20 and service call logical processor 22.

Figure 3:
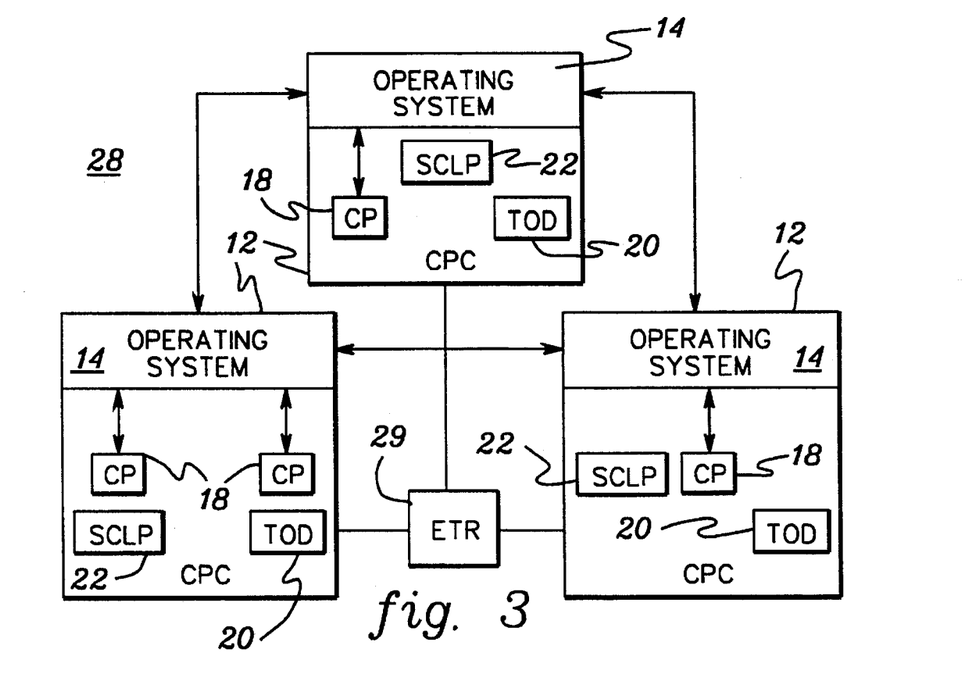
FIG. 3 depicts one embodiment of a data processing system having a coupled system environment, which incorporates the principles of the present invention.

In addition to the above, the technique of the present invention is also incorporated in a coupled system environment, such as the one depicted in FIG. 3. Once again, like reference numbers are used to represent similar components. As one embodiment, data processing system 28 includes a plurality of central processing complexes 12. Each central processing complex 12 includes one or more central processors 18, time of day clock 20 and service call logical processor 22. Each central processor of a particular central processing complex is coupled to and communicates with its respective operating system 14. (It is possible that one or more of the central processing complexes is logically partitioned, as shown in FIG. 2.)

Coupled to the central processing complexes is an external time of reference (ETR) 29, which is used to synchronize the time of day used for each of the systems. External time of reference 29 provides time stamps of control information to be written into a log to document recovery from failures, backing out of undesired operations and for audit trails, as well as for synchronizing multi-system processes. External time of reference 29 synchronizes time of day clock 20 to a precision equal to or less than the duration of the shortest externally visible operation.

Under certain circumstances, processes initiated by either hardware (e.g., service call logical processors), operating system software, or a console operator, require the stopping for a prolonged time period of one or more central processors affected by the processes. Examples of such processes include dynamic microcode installation, which is initiated by hardware or an operator, and storage reassignment, which is initiated by the operating system or hardware. As a result of a central processor (CP) stop, software running on the central processors affected by the stop will be disrupted often resulting in outages or termination of processes that are timed with time of day clock 20 or external time of reference 29. In addition to the above, in a coupled system environment, central processor stops can prevent a system from maintaining a heartbeat which could, in turn, result in another system taking a disruptive recovery action against the system experiencing the stop or the stopped system may hold a shared resource which the other systems cannot obtain, thus, also being affected by the disruption. As one example, in MVS, the following heartbeat/recovery areas may be affected, which is disruptive to the entire installation: excessive spin loop detection, cross-coupling facility heartbeat, network timing and cross-reference facility.

In accordance with the principles of the present invention, when the hardware knows it must perform a disruptive action, such as a stop of the central processor, the hardware provides advance notification to all affected operating systems. Furthermore, in one preferred embodiment, the hardware does not proceed with the disruptive action, such as the central processor stop, until it receives return acknowledgement from the operating systems that the stop can be performed. The operating systems may respond back to the hardware to proceed as planned with the stoppage or to re-initiate the stoppage only after a specified delay. This allows the operating systems to prepare for any consequences of the hardware stop.

The logic associated with the technique of the present invention for controlling disruptive hardware actions by providing advance notification to the affected operating systems prior to performing the disruptive action is described in detail below. In particular, with reference to FIG. 4, one embodiment of the controlling technique of the present invention, as it relates to a single system environment (such as the one discussed with reference to FIG. 1) is described in detail.

Figure 4:
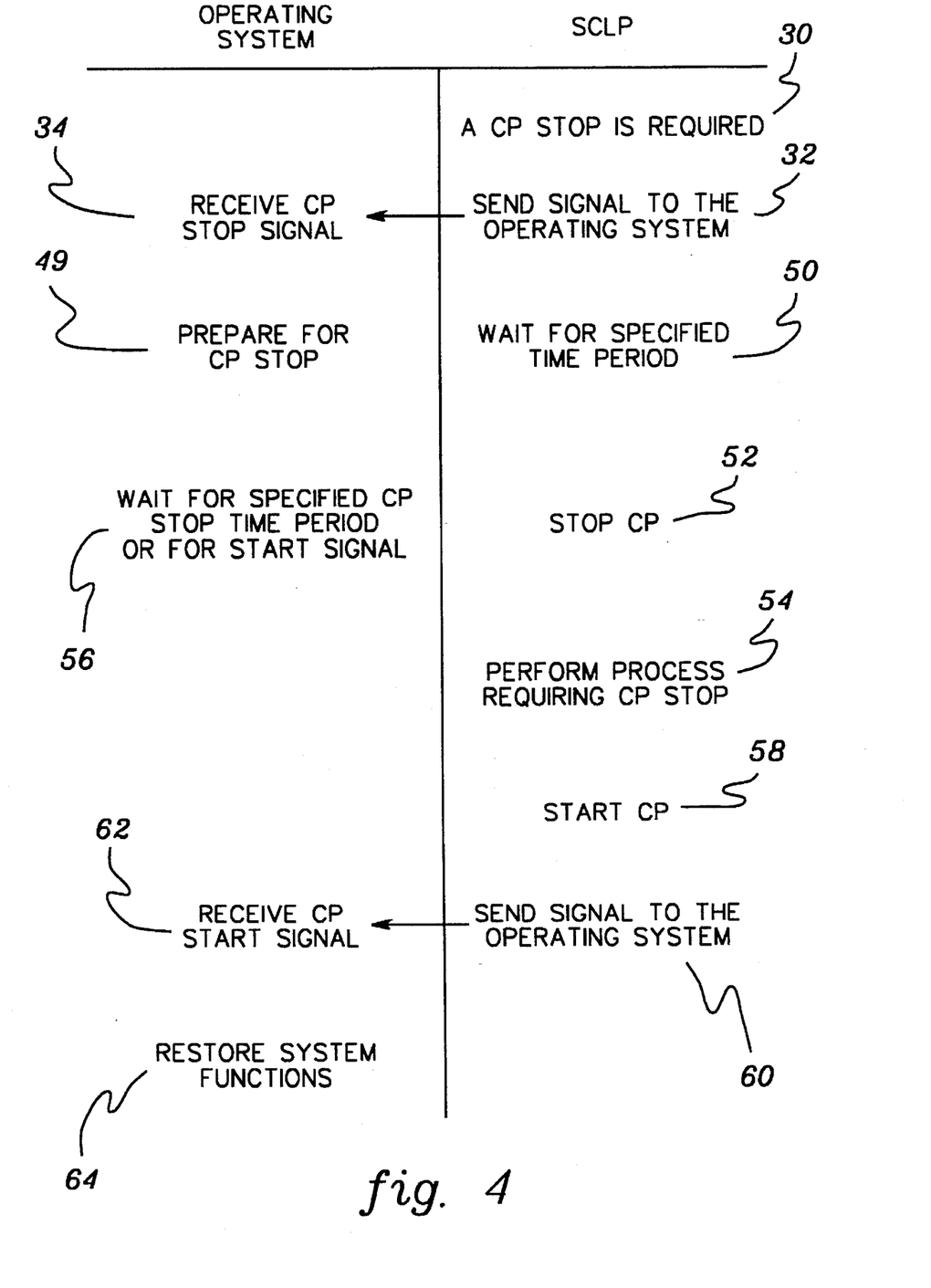
FIG. 4 depicts one example of the logic associated with performing a disruptive hardware action on the system depicted in FIG. 1, in accordance with the principles of the present invention.

Initially, the hardware and, more particularly, service call logical processor 22, either determines from an SCLP command word, described below, or is notified from a console operator or an internal hardware function that a stop of central processor 18 is required in order to successfully perform a designated action, STEP 30 "A CP STOP IS REQUIRED." Subsequent to making this determination or receiving this information, in accordance with the principles of the present invention, the service call logical processor sends a signal to operating system 14 indicating that the central processor is going to be stopped, STEP 32 "SEND SIGNAL TO THE OPERATING SYSTEM."

In one embodiment, the signal is sent via a service call logical processor (SCLP) event mechanism. (The event mechanism is only one example. Other mechanisms may also be used, such as a machine check interrupt or other interrupt, or an I/O or network interaction.) The service call logical processor event mechanism is described in detail in "Method and Apparatus for Asynchronous Communication of Changed Processing Capability," by M. Crisman et al, Ser. No. 07/732985, filed Jul. 19, 1991, now abandoned and assigned to International Business Machines Corporation, and is hereby incorporated by reference. In particular, an unsolicited service-signal external interrupt is sent from service call logical processor 22 to operating system 14 and the operating system issues a read event-data (RED) service call logical processor command which completes with another service-signal internal interrupt, STEP 34 "RECEIVE CP STOP SIGNAL".

Figure 5:
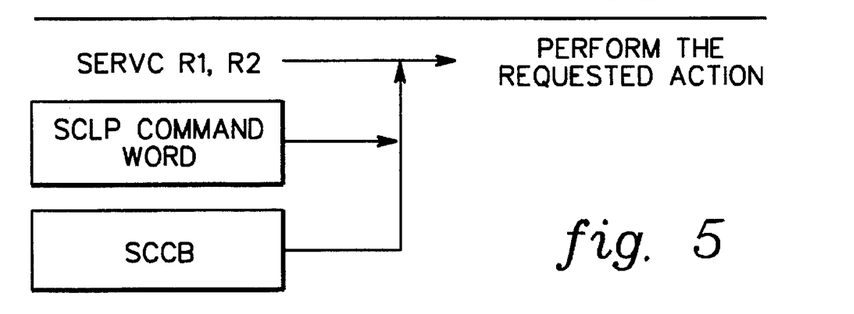
FIG. 5 depicts one example of a service call logical processor command.

Referring to FIG. 5, the command is issued via a service call instruction (SERVC) having two operands R1 and R2. The first operand (R1) contains a service call logical processor command word, which in this instance is the read event-data SCLP command, and the second operand (R2) contains an absolute address of a service call control block (SCCB). The service call control block is used to pass information pertinent to a particular command from the operating system to the service call logical processor on initiation of an SCLP command and to pass information back from the service call logical processor to the operating system at the completion of the command.

In one example, a service call control block 36 (FIG. 6) includes a header 38 and one or more event buffers 40. Header 38 is used to provide information about service call control block 36 and, in one instance, includes a length field indicating the length of the service call control block, a service call logical processor response code and a number of flags. Event buffers 40 are used to transport information from the service call logical processor to the operating system and from the operating system back to the service call logical processor. It is the event buffers and in particular, a signal-stop event buffer, which is used in accordance with the principles of the present invention, to indicate to the operating system that a stop of the central processor is to occur. One embodiment of signal-stop event buffer 44 is described in detail below with reference to FIG. 7.

Figure 7:
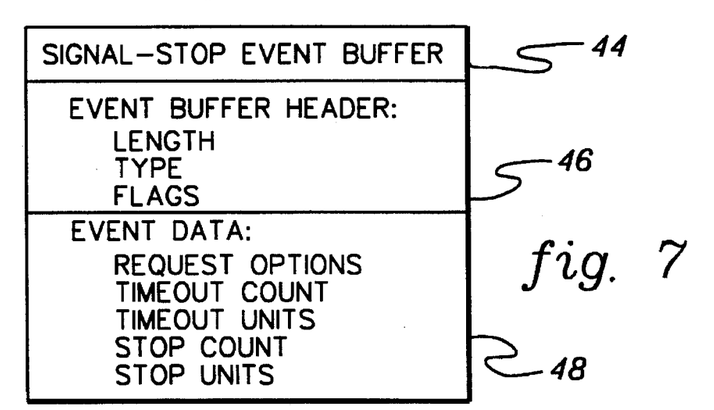
FIG. 7 depicts one example of an event buffer used with the service call logical processor command, in accordance with the principles of the present invention.

Referring to FIG. 7, in one example, signal-stop event buffer 44 contains an event buffer header 46 and event data 48. In one embodiment, event buffer header 46 includes the following fields, which are described in detail below:

(a) A length field, which indicates the length of the event buffer. In one example, the signal-stop event buffer is 13 bytes long.

(b) A type field having a value of 24 hex, which identifies that this event buffer is a signal-stop event buffer. A signal-stop event type is used by the service call logical processor, in accordance with the principles of the present invention, to signal to the operating system that a disruptive action is to occur and allowing the operating system to de-sensitize all operating system time-dependent functions and perform any other required preparation in anticipation of the operating system being stopped for a brief period of time, and to notify the operating system when normal hardware operation is resumed. It is also used by the operating system to signal the service call logical processor to proceed with the central processor stop or re-initiate the signal-stop event after a specific delay.

As described in further detail below, when the operating system responds to the signal-stop event prior to timeout expiration, the service call logical processor either proceeds with the central processor stop if the operating system response indicates to proceed or if the installation policy indicates to proceed regardless of the operating system response, or aborts the central processor stop, if the operating system response indicates to delay the signal-stop event.

However, when the operating system does not respond to the signal-stop event prior to timeout expiration, depending on the installation policy, the service call logical processor either proceeds with the central processor stop or aborts it.

(c) A number of flags including a processor event buffer flag and an error return indicator flag. When the processor event buffer flag is set to one, the event buffer was processed successfully. On the other hand, if the flag is set to zero, the event buffer was not processed successfully and subsequent event buffers should not be processed. When error return indicator flag is set to one, the event buffer is returnable to the sender and, when set to zero, it is non-returnable.

In one example, event data 48 includes the following fields, in accordance with the principles of the present invention:

(a) A force bit request option, which is used to convey to the operating system how critical it is for the service call logical processor to perform the central processor stop. That is, whether the installation policy will "force" the central processor stop on a timeout condition or when the operating system indicates to abort the central processor stop.

Should the force bit be set to zero (i.e., FORCE (NO)), the central processor stop is aborted when such a stop is disruptive to the operating system. In particular, when there is a timeout condition, or when the operating system response to the signal-stop event indicates that it cannot tolerate a central processor stop at the specified time, the central processor stop is aborted or postponed.

On the other hand, when the force bit is set to one (FORCE(YES)), it specifies that the installation policy is to proceed with the central processor stop at the risk of disrupting the affected operating systems.

(b) A timeout count, which indicates when the central processor stop is expected to take place. The service call logical processor function responsible for handling the central processor stop notification waits for the specified timeout interval before initiating the stop. However, the timeout interval starts when the operating system receives the signal-stop event type. That is, the service call logical processor does not decrement the timeout count until the operating system issues the read event-data SCLP command that transfers the pending signal-stop event buffer and that command successfully completes with an interrupt. If the operating system does not respond to the signal-stop event prior to timeout expiration, depending on the installation policy (i.e., the value of the force bit), the service call logical processor either proceeds with the central processor stop, aborts it, or re-initiates the signal-stop event.

When the FORCE(NO) option is specified and the signal-stop event is aborted, the service call logical processor may re-initiate the signal-stop event with the FORCE(YES) option.

(c) Timeout Units, which indicate the unit of measurement for the timeout count. In particular, if timeout units is equal to 00, the timeout count is in seconds, and if the timeout units is equal to 01, the timeout count is in minutes. Further, if the timeout units is equal to 02 or 03, the timeout count is in hours or milliseconds, respectively.

(d) A stop count, which indicates the expected duration of the central processor stop interval. When the service call logical processor initiates a signal stop event and the stop count is zero, it indicates that the central processor stop time interval has expired and normal central processor operation has resumed.

When the operating system initiates the signal-stop event and the stop-count field is set to zeros, it indicates that the operating system is capable of tolerating the central processor stop, as specified by the initial CP stop event time duration, and the service call logical processor can proceed with the central processor stop operation. Otherwise, when the operating system initiates the signal-stop event and the stop-count field is set to a value other than zeros, it indicates that the operating system is not capable of tolerating the central processor stop, as specified by the initial central processor stop event time duration, and the service call logical processor should not proceed with the central processor stop operation.

(e) Stop units, which indicate the unit of measurement for the stop count. In particular, if stop units is equal to 00, then the stop count is in seconds. Similarly, if stop units is equal to 01, then the stop count is in minutes and, if stop units is equal to 02, the stop count is in hours. Further, if stop units is equal to 03, then the stop count is in milliseconds.

Figure 6:
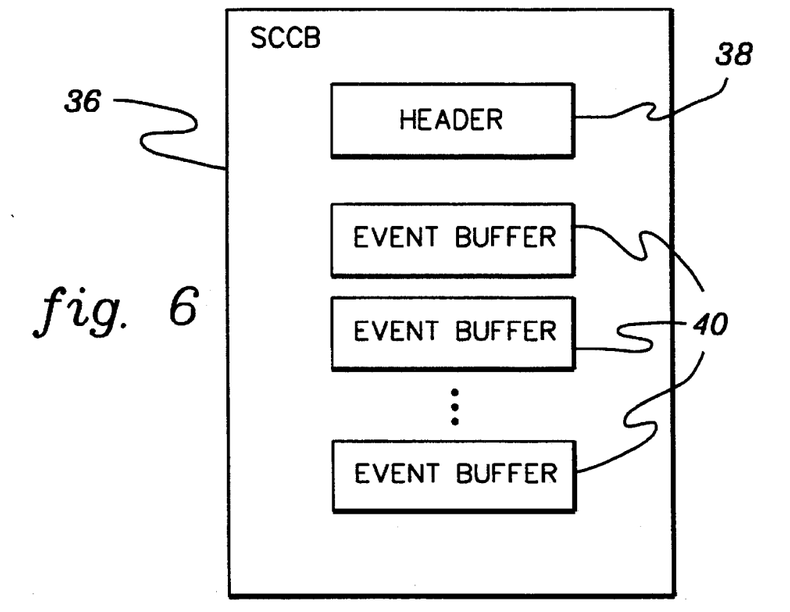
FIG. 6 depicts one example of a service call control block associated with the service call logical processor command of FIG. 5.

The signal-stop event buffer, described in detail above, is placed within the service call command block and then, the service call logical processor presents another service-signal external interrupt to the operating system. At this point, the operating system is capable of reading the contents of the service call control block. Upon reading the contents of the service call control block, the operating system determines that a central processor stop is being initiated. In particular, the operating system learns that the stop will begin at a predefined time (indicated by the timeout count operand) and will last for a predetermined amount of time (indicated by the stop count operand).

Referring back to FIG. 4, subsequent to learning about the central processor stop, the operating system prepares for the stop, STEP 49 "PREPARE FOR CP STOP," by disabling applicable time dependent recovery functions, driving transactions to a stable state, and in general, by de-sensitizing all time based functions and performing any other necessary functions, such as, for example, informing other sysplex members about potentially missing a heartbeat. In the meantime, the service call logical processor function responsible for handling the central processor stop notification waits to perform the stop until the timeout count is equal to zero, STEP 50 "WAIT FOR SPECIFIED TIME PERIOD."

After the timeout count reaches zero, the service call logical processor stops the central processor by known means, STEP 52 "STOP CP," and the function requiring the stop is performed, STEP 54 "PERFORM PROCESS REQUIRING CP STOP."

During this time, the operating system function responsible for handling the central processor stop notification waits until it can start processing once again, STEP 56 "WAIT FOR SPECIFIED CP STOP TIME PERIOD OR FOR START SIGNAL." In particular, the operating system function responsible for handling the central processor stop notification waits for the stop count to be zero or for a central processor start signal to be sent from the service call logical processor to the operating system.

When the process requiring the stop is complete, the service call logical processor starts the central processor, STEP 58 "START CP" and a signal is sent from the service call logical processor to the operating system notifying the operating system that the central processor has been started, STEP 60 "SEND SIGNAL TO THE OPERATING SYSTEM." As described above, the signal is sent via the service call logical processor event mechanism and, in particular, the signal-stop event buffer. Subsequent to the operating system receiving the signal and reading the buffer, STEP 62 "RECEIVE CP START SIGNAL," which indicates that the central processor has been started, system functions are restored by the operating system, STEP 64 "RESTORE SYSTEM FUNCTIONS."

Described above is one embodiment for providing advance notification to the operating system that a central processor of a single data processing system is being stopped. Described below is one embodiment wherein the technique of the present invention is incorporated in a multiple system, such as the one depicted in FIG. 2. The logic associated with this embodiment is described with reference to FIG. 8.

Figure 8:
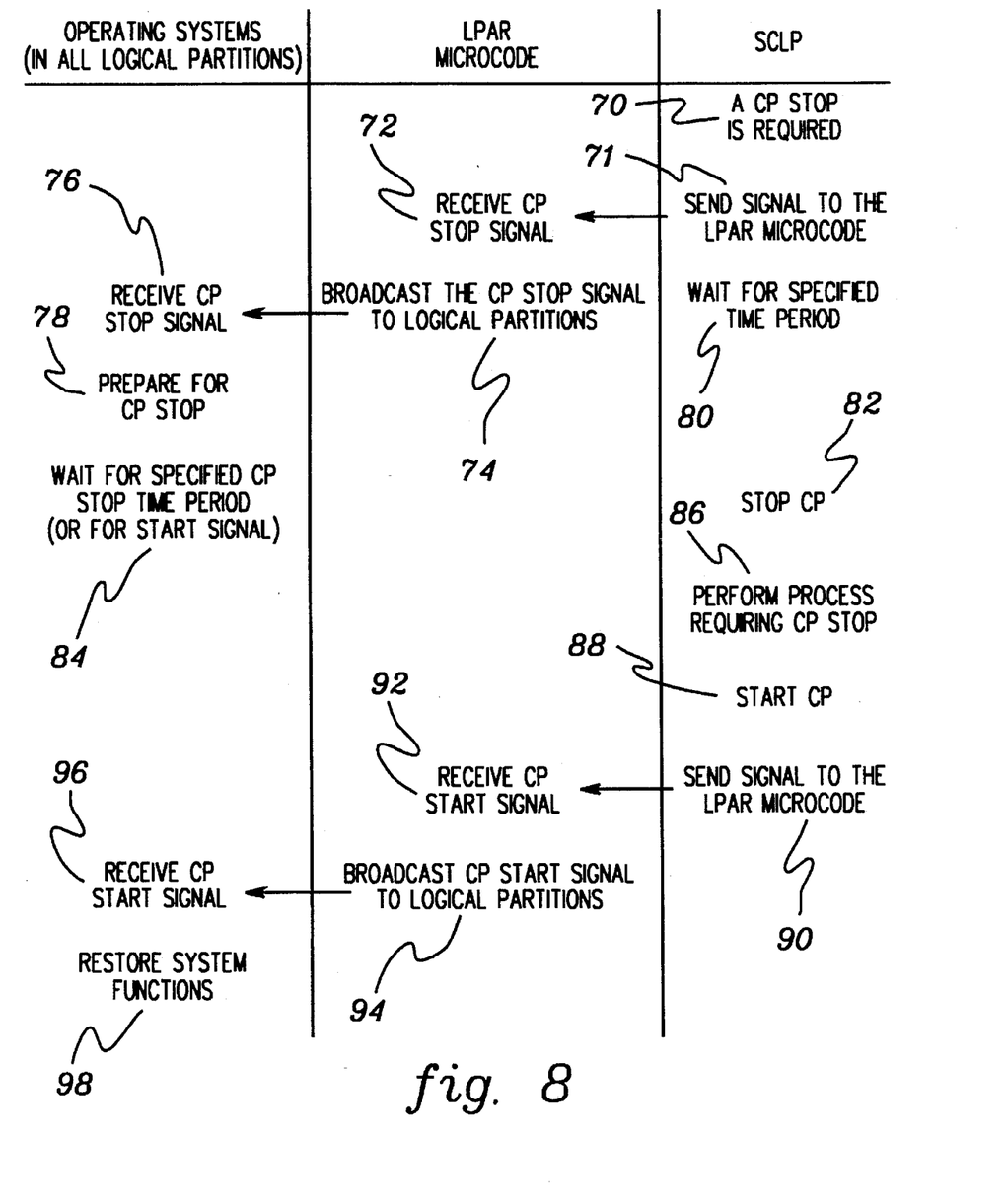
FIG. 8 depicts one embodiment of the logic associated with performing a disruptive hardware action in the logical partitioning environment of FIG. 2, in accordance with the principles of the present invention.

Initially, the service call logical processor either determines from the SCLP command code or is notified by another hardware function that a stop of the central processor is required, STEP 70 "A CP STOP IS REQUIRED." Subsequently, a signal is sent from the service call logical processor to the microcode of the logical partitioning (LPAR) mode hypervisor notifying the microcode of the stop, STEP 71 "SEND SIGNAL TO THE LPAR MICROCODE." (LPAR microcode functions are described in detail in International Business Machines' Enterprise System 3090/Enterprise System 9000 Processor Resource Systems Manager Planning Guide, Pub. No. GA22-7123-07, which is hereby incorporated by reference.) In one embodiment, the signal is sent via the service call logical processor event mechanism, described above.

When the LPAR microcode receives the signal indicating that the central processor is to be stopped, STEP 72 "RECEIVE CP STOP SIGNAL," the LPAR microcode broadcasts the signal to each of the operating systems in all of the logical partitions of the data processing system, STEP 74 "BROADCAST THE CP STOP SIGNAL TO LOGICAL PARTITIONS." Once again, this broadcast is sent via the service call logical processor event mechanism and includes the start time of the central processor stop as well as the projected duration of the stop. The operating systems running in the logical partitions receive the central processor stop signal, STEP 76 "RECEIVE CP STOP SIGNAL" and start preparing for the stop of the central processor, STEP 78 "PREPARE FOR STOP."

The service call logical processor function responsible for handling the central processor stop notification waits until the specified start time of the central processor stop has been reached, STEP 80 "WAIT FOR SPECIFIED TIME PERIOD" and then, performs the stop, STEP 82 "STOP CP." In the meantime, the operating systems (i.e., the functions of those operating systems responsible for handling the central processor stop notification) affected by the central processor stop wait for the specified central processor stop time period to elapse or for a central processor start signal, STEP 84 "WAIT FOR SPECIFIED CP STOP TIME PERIOD (OR FOR START SIGNAL)."

Subsequent to performing the central processor stop, the service call logical processor performs the process requiring the stop of one or more of the central processors, STEP 86 "PERFORM PROCESS REQUIRING CP STOP." Thereafter, every stopped central processor is started, STEP 88 "START CP" and a signal is sent from the service call logical processor to the LPAR microcode via the service call logical processor event mechanism, STEP 90 "SEND SIGNAL TO THE LPAR MICROCODE." The LPAR microcode receives the start signal, STEP 92 "RECEIVE CP START SIGNAL" and broadcasts it to each of the logical partitions, STEP 94 "BROADCAST CP START SIGNAL TO LOGICAL PARTITIONS." The operating systems residing in the logical partitions receive the central processor start signal, STEP 96 "RECEIVE CP START SIGNAL" and restore system functions, STEP 98 "RESTORE SYSTEM FUNCTIONS." If, however, the operating systems did not receive the start signal by the time allotted for the stop, the operating systems would continue to restore system functions to a normal operating state.

In one further embodiment, the operating systems send an acknowledgment/permission to the hardware, indicating whether the central processor or processors may be stopped. One example of the logic associated with the acknowledgment portion of the controlling technique of the present invention is described in detail with reference to FIG. 9.

Figure 9:
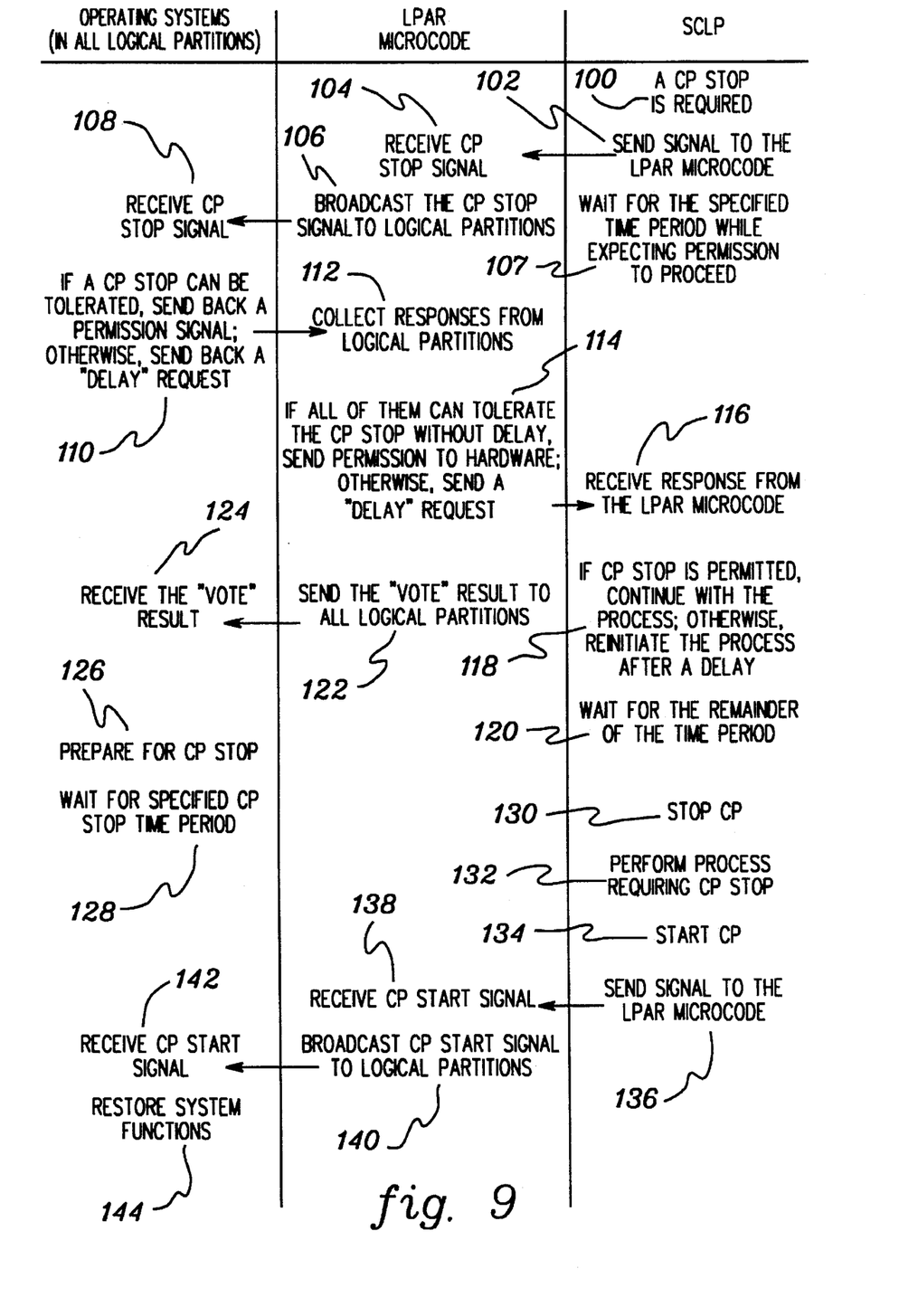
FIG. 9 depicts one embodiment of the logic associated with a disruptive hardware action, wherein acknowledgement or permission is provided, in accordance with the principles of the present invention.

Once again, when the service call logical processor determines or is notified that a stop of one or more central processors is required, STEP 100 "A CP STOP IS REQUIRED," the service call logical processor sends a signal to the LPAR microcode via the service call logical processor event mechanism, STEP 102 "SEND SIGNAL TO THE LPAR MICROCODE." The LPAR microcode receives the signal, STEP 104 "RECEIVE CP STOP SIGNAL" and broadcasts it to the logical partitions, STEP 106 "BROADCAST THE CP STOP SIGNAL TO LOGICAL PARTITIONS." In the meantime, the service call logical processor function responsible for handling the central processor stop notification waits for the specified time period, while expecting permission to proceed, STEP 107.

When the operating systems in the logical partitions receive the stop signal, STEP 108 "RECEIVE CP STOP SIGNAL," each determines whether at the specified time it can tolerate a stop of the central processors for an amount of time specified in the signal-stop event buffer. Each operating system sends to the LPAR microcode via the service call logical processor event mechanism a permission signal, if the stop can be tolerated, or a delay request, if the stop cannot be tolerated, STEP 110 "IF A CP STOP CAN BE TOLERATED, SEND BACK A PERMISSION SIGNAL; OTHERWISE, SEND BACK A DELAY REQUEST." In particular, a write event data SCLP command containing a signal-stop event buffer is used to indicate whether permission is granted or a delay is requested. If the stop count in the signal-stop event buffer is set to zero, then permission is granted. Otherwise, if the stop count is other than a zero, a delay is specified. The delay is equal to the maximum value of the stop count of the stop counts returned by the operating systems in logical partitions.

The LPAR microcode collects the responses from each of the affected operating systems, STEP 112 "COLLECT RESPONSES FORM LOGICAL PARTITIONS." If all affected operating systems can tolerate the specified central processor stop, LPAR microcode sends the service call logical processor a permission signal via the signal-stop event buffer, STEP 114. Otherwise, LPAR microcode sends the service call logical processor a request to postpone the central processor stop, STEP 114.

When the service call logical processor receives the response from the LPAR microcode, STEP 116 "RECEIVE RESPONSE FROM LPAR MICROCODE," it examines the event buffer. If the central processor stop is permitted, the SCLP continues with the central processor stopping process, or if the central processor stop is not permitted, it re-initiates the process after a delay, STEP 118. Thereafter, if permitted by the operating systems in the logical partitions, the service call logical processor function responsible for handling the central processor stop notification waits until the pre-specified start time to stop the central processor, STEP 120 "WAIT FOR THE REMAINDER OF THE TIME PERIOD."

In addition to the above, the LPAR microcode sends the combined responses (in the form of another signal-stop event buffer to which the operating systems do not have to respond) to the operating systems running in the logical partitions to inform each of the decision, STEP 122 "SEND THE VOTE RESULT TO ALL LOGICAL PARTITIONS." The operating systems receive the response, STEP 124 "RECEIVE THE VOTE RESULT" and if the central processor is going to be stopped, each of the operating systems prepares for the stop, STEP 126 "PREPARE FOR CP STOP." Thereafter, each of the operating system functions responsible for handling the central processor stop notification waits for the specified central processor stop time period or the central processor start signal, whichever occurs first, STEP 128 "WAIT FOR SPECIFIED CP STOP TIME PERIOD."

The central processor is stopped at the appropriate time, STEP 130 "STOP CP" and the process requiring the stop is performed, STEP 132 "PERFORM PROCESS REQUIRING CP STOP." Thereafter, the one or more stopped central processors is started, STEP 134 "START CP." Subsequently, the service call logical processor sends a start signal to the LPAR microcode, STEP 136 "SEND SIGNAL TO THE LPAR MICROCODE." When the LPAR microcode receives the start signal, STEP 138 "RECEIVE CP START SIGNAL," it broadcasts the start signal to the operating systems in the logical partitions, STEP 140 "BROADCAST CP START SIGNAL TO LOGICAL PARTITIONS." The affected operating systems receive the broadcast, STEP 142

"RECEIVE CP START SIGNAL" and their system functions are restored, STEP 144 "RESTORE SYSTEM FUNCTIONS."

Described above is a mechanism whereby advance notification is provided to operating systems before a stop of one or more central processors is performed. This advantageously permits the operating systems to prepare for the stop by disabling applicable time dependent recovery functions, informing their coupling partners about potential missing heartbeats, driving transactions to a stable state, freeing global resources that may be needed by the coupled systems and, in general, by de-sensitizing all time based functions. Optionally, the operating systems may give an indication to the hardware of whether the central processor stop may be performed at the indicated time. If the operating system does not want the stop to occur at the present time, it may provide to the hardware a time delay. After the time delay has elapsed, the hardware may re-initiate the stop.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for minimizing the effects of disruptive hardware actions in a data processing system having an operating system, said method comprising:

providing advance notification to said operating system that a disruptive action may occur;

acknowledging, by said operating system, the occurrence of said disruptive action;

performing said disruptive action if said operating system allows said disruptive action to occur and after said advance notification is provided; and continuing processing within said data processing system when said operating system does not allow said disruptive action to occur.

2. The method of claim 1, wherein said acknowledging step comprises the step of determining whether said performing step is to occur at a predefined time.

3. The method of claim 2, wherein said determining step comprises setting a predetermined delay when said performing step is not to occur at the predefined time.

4. A method for minimizing the effects of disruptive hardware actions in a data processing system having an operating system and a central processor, said method comprising:

providing advance notification to said operating system that a disruptive action may occur, wherein said disruptive action comprises stopping said central processor;

performing said disruptive action if said operating system allows said disruptive action to occur and after said advance notification is provided; and continuing processing within said data processing system when said operating system does not allow said disruptive action to occur.

5. A method for minimizing the effects of disruptive hardware actions in a data processing system having a plurality of operating systems, said method comprising:

providing advance notification of a disruptive action to one or more of said operating systems to be affected by said disruptive action;

performing said disruptive action if said one or more operating systems allows said disruptive action to occur and after said advance notification is provided; and continuing processing within said data processing system when said one or more operating systems does not allow said disruptive action to occur.

6. A method for minimizing the effects of disruptive hardware actions in a data processing system having an operating system, said method comprising:

providing advance notification to said operating system that a disruptive action may occur, said providing step comprising a predefined command for providing said advance notification;

performing said disruptive action if said operating system allows said disruptive action to occur and after said advance notification is provided; and continuing processing within said data processing system when said operating system does not allow said disruptive action to occur.

7. The method of claim 6, wherein said predefined command comprises a signal stop event buffer.

8. The method of claim 7, wherein said signal stop event buffer includes a timeout count indicating when said disruptive action is to occur and a stop count indicating the projected duration of said disruptive action.

9. A system for minimizing the effects of disruptive hardware actions in a data processing system having an operating system, said system comprising:

means for providing advance notification to said operating system that a disruptive action may occur;

means for acknowledging the occurrence of said disruptive action;

means for performing said disruptive action if said operating system allows said disruptive action to occur and after said advance notification is provided; and means for continuing processing within said data processing system when said operating system does not allow said disruptive action to occur.

10. The system of claim 9, wherein said acknowledging means comprises means for determining whether said disruptive action is to occur at a predefined time.

11. The system of claim 10, wherein said determining means comprises means for setting a predetermined delay when said disruptive action is not to occur at the predefined time.

12. A system for minimizing the effects of disruptive hardware actions in a data processing system having an operating system and a central processor, said system comprising:

means for providing advance notification to said operating system that a disruptive action may occur, wherein said disruptive action comprises stopping said central processor;

means for performing said disruptive action if said operating system allows said disruptive action to occur and after said advance notification is provided; and means for continuing processing within said data processing system when said operating system does not allow said disruptive action to occur.

13. A system for minimizing the effects of disruptive hardware actions in a data processing system having a plurality of operating systems, said system comprising:

means for providing advance notification of a disruptive action to one or more of said plurality of operating systems to be affected by said disruptive action;

means for performing said disruptive action if said one or more operating systems allows said disruptive action to occur and after said advance notification is provided; and continuing processing within said data processing system when said one or more operating systems does not allow said disruptive action to occur.

14. A system for minimizing the effects of disruptive hardware actions in a data processing system having an operating system, said system comprising:

means for providing advance notification to said operating system that a disruptive action may occur, wherein said providing means comprises a predefined command for providing said advance notification;

means for performing said disruptive action if said operating system allows said disruptive action to occur and after said advance notification is provided; and means for continuing processing within said data processing system when said operating system does not allow said disruptive action to occur.

15. The system of claim 14, wherein said predefined command comprises a signal stop event buffer.

16. The system of claim 15, wherein said signal stop event buffer comprises a timeout count indicating when said disruptive action is to occur and a stop count indicating the projected duration of said disruptive action.

17. A method for minimizing the effects of disruptive actions in a data processing system, said data processing system comprising a hardware element, and said method comprising:

processing an advance request for a disruptive action within said data processing system; and reacting to said advance request by sending an acknowledgment of said advance request to said hardware element and by either accepting said advance request if said processing indicates that said disruptive action can occur, or denying said advance request and continuing operation of said data processing system without said disruptive action if said processing indicates that said disruptive action cannot occur.

18. The method of claim 17, wherein said step of reacting comprises denying said advance request in said acknowledgement of said advance request.

19. The method of claim 17, wherein said step of reacting comprises granting said advance request in said acknowledgement of said advance request.

20. The method of claim 19, wherein said step of granting comprises setting a predefined delay after which said disruptive action can occur.

21. A method for minimizing the effects of disruptive actions in a data processing system, said method comprising:

processing an advance request for a disruptive action within said data processing system; and reacting to said advance request by either accepting said advance request if said processing indicates that said disruptive action can occur and preparing for said disruptive action during a predefined time after which said disruptive action will occur, or by denying said advance request and continuing operation of said data processing system without said disruptive action if said processing indicates that said disruptive action cannot occur.

22. A method for minimizing the effects of disruptive actions in a data processing system, said method comprising:

processing an advance request for a disruptive action within said data processing system; and reacting to said advance request by either accepting said advance request if said processing indicates that said disruptive action can occur, or denying said advance request, by not acknowledging said advance request within a predefined time period and continuing operation of said data processing system without said disruptive action if said processing indicates that said disruptive action cannot occur.

23. A system for minimizing the effects of disruptive actions in a data processing system comprising a hardware element, said system comprising:

means for processing an advance request for a disruptive action within said data processing system; and means for reacting to said advance request by either accepting said advance request if said means for processing indicates that said disruptive action can occur, or denying said advance request and continuing operation of said data processing system without said disruptive action if said means for processing indicates that said disruptive action cannot occur, and wherein said reacting means comprises a means for sending an acknowledgement of said advance request to said hardware element.

24. A system for minimizing the effects of disruptive actions in a data processing system, said system comprising:

means for processing an advance request for a disruptive action within said data processing system; and means for reacting to said advance request by either accepting said advance request if said means for processing indicates that said disruptive action can occur, wherein said means for reacting comprises means for preparing for said disruptive action during a predefined time after which said disruptive action will occur, or by denying said advance request and continuing operation of said data processing system without said disruptive action if said means for processing indicates that said disruptive action cannot occur.

25. A system for minimizing the effects of disruptive actions in a data processing system, said system comprising:

means for processing an advance request for a disruptive action within said data processing system; and means for reacting to said advance request by either accepting said advance request if said means for processing indicates that said disruptive action can occur, or denying said advance request, by not acknowledging said advance request within a predefined time period, and continuing operation of said data processing system without said disruptive action if said means for processing indicates that said disruptive action cannot occur.

26. A method for minimizing the effects of disruptive hardware actions in a data processing system having an operating system, said method comprising:

providing advance notification to said operating system that a disruptive action may occur;

performing said disruptive action if said operating system allows said disruptive action to occur and after said advance notification is provided;

desensitizing at least one time sensitive operation within the data processing system to said disruptive action if said operating system allows said disruptive action to occur; and continuing processing within said data processing system when said operating system does not allow said disruptive action to occur.

27. A system for minimizing the effects of disruptive hardware actions in a data processing system having an operating system, said system comprising:

means for providing advance notification to said operating system that a disruptive action may occur;

means for performing said disruptive action if said operating system allows said disruptive action to occur and after said advance notification is provided;

means for desensitizing at least one time sensitive operation within the data processing system to said disruptive action if said operating system allows said disruptive action to occur; and     means for continuing processing within said data processing system when said operating system does not allow said disruptive action to occur.

28. A method for minimizing the effects of disruptive actions in a data processing system, said method comprising:

processing an advance request for a disruptive action within said data processing system;

desensitizing at least one time sensitive operation within the data processing system to said disruptive action if said processing indicates that said disruptive action can occur; and     reacting to said advance request by either accepting said advance request if said processing indicates that said disruptive action can occur, or denying said advance request and continuing operation of said data processing system without said disruptive action if said processing indicates that said disruptive action cannot occur.

29. A system for minimizing the effects of disruptive actions in a data processing system, said system comprising:

means for processing an advance request for a disruptive action within said data processing system;

means for desensitizing at least one time sensitive operation within the data processing system to said disruptive action if said means for processing indicates that said disruptive action can occur; and     means for reacting to said advance request by either accepting said advance request if said means for processing indicates that said disruptive action can occur, or denying said advance request and continuing operation of said data processing system without said disruptive action if said means for processing indicates that said disruptive action cannot occur.

\* \* \* \* \*

UNITED STATES PATENT AND TRADEMARK OFFICE
Certificate

Patent No. 5,553,292                                                              Patented: September 3, 1996

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James C. Daly, Millbrook, NY (US); Jonel George, Pleasant Valley, NY (US); Paul G. Greenstein, Fishkill, NY (US); John T. Rodell, Wappingers Falls, NY (US); and Charles W. Gainey, Jr., Poughkeepsie, NY (US).

Signed and Sealed this Twenty-seventh Day of December 2011.

MARK RINEHART
*Supervisory Patent Examiner*
Art Unit 2111
Technology Center 2100